Patented Mar. 1, 1927.

1,619,534

UNITED STATES PATENT OFFICE.

HANS MARTINUS OLSON, OF BURBANK, CALIFORNIA.

OXYCHLORIDE CEMENT AND METHOD OF MAKING SAME.

No Drawing.      Application filed October 13, 1923. Serial No. 668,366.

This invention relates to compositions of matter and more particularly it relates to a cement and to a process of making the same.

An object of my invention is to provide a cement which, in its dry state—that is, before being gauged,—is non-hygroscopic and which will keep dry for an indefinite period under ordinary storage conditions, and even when exposed to a moist atmosphere.

Another object of my invention is to provide a cement possessing improved plasticity in the gauging and application processes, and improved strength and adhesiveness when set.

A further object is to provide a cement which, after setting, is capable of resisting the action of water or its vapor, atmospheric oxygen, and certain other chemicals.

A further object of my present invention is to provide a process for making cement having the above mentioned characteristics of a standardized composition, whereby a uniform product may be at all times manufactured, and a maximum efficiency in the use of the cement thereby attained.

Other objects may be inferred from a reading of the following specification.

More particularly, I propose to make an improved cement of that class known in the art as oxychloride cements. Previous oxychloride cements consisted essentially of a metallic oxide, such as magnesium oxide, mixed with a solution of a metallic chloride, such as magnesium chloride. The combination of the magnesium oxide with the magnesium chloride has previously been effected, not in the factory, but in the field. This procedure, however, has heretofore been obligatory inasmuch as the metallic chloride, purposely used for its hygroscopic quality, could not be mixed with the metallic oxide at the factory without subsequently having its hygroscopic property annulled during the period between the manufacture of the cement and its use. According to my invention, however, a hygroscopic substance may be added to metallic oxide in the factory without danger of impairing the former. This is possible inasmuch as I employ as an ingredient of my cement a water and water vapor, proofing material which protects the hygroscopic substance. In the field, either of two methods for combining the oxide with the chloride has been employed. According to the first method, a solution of magnesium chloride has been made by a laborer, the strength of this solution being according to the judgment of the laborer. The solution of magnesium chloride has then been mixed with a quantity of magnesium oxide, the proportion of the magnesium chloride solution to the magnesium oxide depending also on the judgment of the laborer. Obviously, this method resulted in a non-uniform product.

To obviate such non-uniformity of the product, manufacturers of the oxide have in some cases prepared a standardized solution of magnesium chloride which has been shipped into the field. Obviously the transportation of the chloride in solution has been extremely inefficient.

According to my invention I not only make an improved cement with other materials than those employed in the prior art but I produce a standardized product of mixing all of the ingredients in the factory, in substantially a dry state according to an improved process.

As one of the constituents of my cement, I employ a metallic oxide. As a representative of the class of compounds known as metallic oxides which I employ and for the sake of simplicity I will hereinafter mention only magnesium oxide, although it is to be understood that other suitable metallic oxides are included in the term magnesium oxide as the latter is used in the specification only.

Incorporate with the magnesium oxide I prefer to use other materials capable of increasing the plasticity of the cement when the latter is gauged, although this plasticity-improving compound is not essential to my improved cement. As a representative of this class of plasticity-giving materials and for the sake of simplicity I will hereinafter mention only magnesium carbonate although it will be understood that other suitable materials are included in the term magnesium carbonate as the latter is used in the specification only.

The magnesium carbonate may be incorporated with the magnesium oxide according to either of two processes. According to the first process a quantity of magnesium carbonate may be finely ground and thoroughly mixed with magnesium oxide. According to the second process, magnesium carbonate may be partially calcined or otherwise partially decomposed to give a mixture of magnesium carbonate and magnesium oxide.

To make the cement I combine with the magnesium carbonate and magnesium oxide a small quantity of an oleaginous substance. The character of this oleaginous material is preferably a liquid at ordinary temperatures, although it may normally be in a solid or a semi-solid state, in which case I liquefy the same by means of heat, or dissolve it in a suitable solvent before mixing it with the magnesium carbonate and magnesium oxide.

More particularly, the oleaginous material which I prefer to use is a mineral oil, although I may use a vegetable or an animal oil, or a combination of these variously-originating oils. The quantity of oleaginous material which I prefer to use in my cement varies from one-tenth of one percent to ten percent of the combined weights of the other ingredients of the cement, although I do not limit myself to these precentages, as in some cases it may be desirable to go outside the limits mentioned. In any case, the amount of oleaginous material employed should be sufficient to offset while the cement is in its dry state, the hygroscopic properties of the hygroscopic chloride which I also employ in the composition of my cement.

As a representative of this class of chemicals I will hereinafter mention only magnesium chloride, although it will be understood that other hygroscopic chlorides are included in the terms as used in the specification only. The magnesium chloride which I employ is preferably treated to remove any water which it may contain, before incorporating it with the other constituents of my cement. For example, magnesium chloride crystals may be subjected to a heat treatment until they are brought into a liquid state. The liquid may then be treated to remove water by any suitable process such, for example, by adding a quantity of a moisture-absorptive material such, for example, as kieselguhr, which, after performing its function, is preferably separated from the magnesium chloride. The quantity of magnesium chloride employed in my cement is such that when the cement is gauged, an oxy-chloride cement will be formed by the interaction of the metallic oxide and metallic chloride. If desired, I may incorporate with the liquid magnesium chloride at this step in the process, the oleaginous material or a portion thereof, which will ultimately enter into the composition of the cement.

In combining the preferred ingredients of my cement, I prefer to add the chloride and the oleaginous material to the magnesium carbonate and magnesium oxide during the grinding process to which the two latter substances are subjected for the purpose of pulverization. The magnesium chloride and the oleaginous material may, however, be added at any other suitable step in the working of the oxide and the carbonate, either simultaneously or separately. In either case, the magnesium carbonate and the magnesium oxide are preferably finely comminuted and should be thoroughly mixed or commingled with fine particles of the oleaginous material to insure a finely ground product in which the ingredients are intimately incorporated or intermixed with each other. This may be accomplished by employing for these purposes any suitable grinding and mixing machine or combinations of the same known in the art.

I will now describe more specifically my cement and the process for making the same. I take a quantity of magnesium carbonate crushed to pieces of about one inch diameter. I then subject the magnesium carbonate to a partial calcination by which a substantial percentage of the magnesium carbonate is converted into magnesium oxide, the resulting product being a mixture of magnesium carbonate and magnesium oxide. I then grind the mixture of magnesium oxide and magnesium carbonate to the required fineness in a suitable mill. During this grinding operation I may add to and thoroughly intermix with the magnesium carbonate and oxide a quantity of magnesium chloride previously dried according to process hereinbefore described. The quantity of magnesium chloride I prefer to employ is from fifteen to twenty-five percent of the combined weight of the magnesium carbonate and magnesium oxide. During the grinding of the magnesium carbonate and magnesium oxide I also add to, and thoroughly incorporate with, the magnesium oxide, magnesium carbonate and magnesium chloride, an oleaginous material. This oleaginous material may consist of a mixture containing seventy-five parts of mineral oil. I prefer to add this oleaginous mixture in liquid form, spraying the same in fine streams into the mixture of magnesium carbonate, magnesium chloride and magnesium oxide. The quantity of oleaginous material employed is preferably about one percent of the combined weight of the magnesium carbonate, magnesium oxide, and magnesium chloride.

Instead of adding the magnesium chloride and the oleaginous material separately to the magnesium carbonate and magnesium oxide, I may add a mixture of the same, the magnesium chloride then being preferably in a molten state.

After thorough grinding and incorporation of the ingredients of my cement, the composition is then in condition to form an oxychloride cement when gauged.

As prepared, my cement is very moisture resistant and consequently may be stored for indefinite periods under ordinary storage conditions. Or it may be exposed to a moist atmosphere or even rain for a long period without impairment of its original quality. Notwithstanding its resistance to the penetration of moisture when stored in quantities, it will nevertheless mix readily with water when gauged. Furthermore, when used as mortar this cement possesses improved plasticity and will "finish" smoother and with greater facility than cement prepared under previous methods. Again, this cement, after setting, possesses very high waterproof qualities, and superior adhesiveness and strength. It is also inert to the action of water; thus the possible decomposition of the oxy-chloride by water is obviated, and in addition, my cement is proof against dilute acids, and is strongly resistant to many other chemical reagents.

I claim—

1. A cement comprising magnesium oxide, one percent of a mixture consisting of seventy-five parts of mineral oil and twenty-five parts of beef fat, and magnesium chloride within the percentages of fifteen to twenty-five parts.

2. A cement comprising partially calcined magnesium carbonate, approximately one percent of a mixture of oleaginous material consisting of seventy-five parts of mineral oil and twenty-five parts of beef fat, and magnesium chloride in the percentage of substantially from fifteen to twenty-five parts.

HANS M. OLSON.